United States Patent
Wang et al.

(10) Patent No.: US 11,586,658 B2
(45) Date of Patent: Feb. 21, 2023

(54) METHOD AND DEVICE FOR MATCHING SEMANTIC TEXT DATA WITH A TAG, AND COMPUTER-READABLE STORAGE MEDIUM HAVING STORED INSTRUCTIONS

(71) Applicant: CHINA UNIONPAY CO., LTD., Shanghai (CN)

(72) Inventors: Yu Wang, Shanghai (CN); Xuetao Qiu, Shanghai (CN); Sishuang Wan, Shanghai (CN); Xiaohan She, Shanghai (CN); Yang Wang, Shanghai (CN); Qi Zhang, Shanghai (CN); Zhijun Fei, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 0 days.

(21) Appl. No.: 17/260,177

(22) PCT Filed: Jul. 4, 2019

(86) PCT No.: PCT/CN2019/094646
§ 371 (c)(1),
(2) Date: Jan. 13, 2021

(87) PCT Pub. No.: WO2020/134008
PCT Pub. Date: Jul. 2, 2020

(65) Prior Publication Data
US 2021/0286835 A1 Sep. 16, 2021

(30) Foreign Application Priority Data
Dec. 27, 2018 (CN) .................... CN201811610544.4

(51) Int. Cl.
*G06F 16/00* (2019.01)
*G06F 16/35* (2019.01)
(Continued)

(52) U.S. Cl.
CPC .............. *G06F 16/35* (2019.01); *G06F 16/36* (2019.01); *G06F 40/117* (2020.01); *G06F 40/30* (2020.01)

(58) Field of Classification Search
CPC .......... G06F 16/35; G06F 16/36; G06F 16/30; G06F 16/117; G06F 40/30; G06F 40/117
See application file for complete search history.

(56) References Cited

U.S. PATENT DOCUMENTS 9,311,386 B1 * 4/2016 Song .................... G06F 16/9535
10,510,018 B2 * 12/2019 Flinn ...................... G06N 5/048
(Continued)

FOREIGN PATENT DOCUMENTS

| CN | 104850650 A | 8/2015 |
| CN | 105975475 | 9/2016 |

(Continued)

OTHER PUBLICATIONS

International Search Report and Written Opinion dated Oct. 8, 2019 issued for International PCT Application No. PCT/CN2019/094646.
(Continued)

*Primary Examiner* — Leslie Wong
(74) *Attorney, Agent, or Firm* — K&L Gates LLP (57) ABSTRACT

A method for matching semantic text data with tags. The method includes: pre-processing multiple semantic text data to obtain original corpus data comprising multiple semantic independent members; determining the degree of association between any two of the multiple semantic independent members according to a reproduction relationship of the multiple semantic independent members in a natural text, determining a theme corresponding to the association according to the degree of association between any two, and thus determining a mapping probability relationship between the multiple semantic text data and the theme;

(Continued)

selecting one of the multiple semantic independent members corresponding to the association as a tag of the theme, and mapping the multiple semantic text data to the tag according to the determined mapping probability relationship between the multiple semantic text data and the theme; and taking the determined mapping relationship between the multiple semantic text data and the tag as a supervision material, and matching the unmapped semantic text data with the tag according to the supervision material.

18 Claims, 6 Drawing Sheets

(51) Int. Cl.
  *G06F 16/36* (2019.01)
  *G06F 40/117* (2020.01)
  *G06F 40/30* (2020.01)

(56) References Cited

U.S. PATENT DOCUMENTS

| | | | | |
|---|---|---|---|---|
| 10,536,728 | B2 * | 1/2020 | Rimon | G06F 16/353 |
| 2004/0088308 | A1 * | 5/2004 | Bailey | G06F 16/355 |
| 2010/0030780 | A1 | 2/2010 | Eshghi et al. | |
| 2016/0179945 | A1 * | 6/2016 | Lastra Diaz | G06F 16/284 |
| | | | | 707/739 |
| 2019/0050875 | A1 * | 2/2019 | McCord | G06F 40/30 |
| 2019/0065576 | A1 * | 2/2019 | Peng | G06F 16/3329 |
| 2021/0073336 | A1 * | 3/2021 | Fox | G06N 3/0454 |

FOREIGN PATENT DOCUMENTS

| | | |
|---|---|---|
| CN | 106033445 | 10/2016 |
| CN | 106055538 A | 10/2016 |
| CN | 106156204 A | 11/2016 |
| CN | 107301199 A | 10/2017 |
| CN | 107798043 A | 3/2018 |
| CN | 107818153 A | 3/2018 |
| CN | 108399228 A | 8/2018 |
| CN | 108959431 A | 12/2018 |
| JP | 2007094855 | 4/2007 |
| JP | 2012042998 | 3/2012 |
| JP | 2014153977 | 8/2014 |
| JP | 2017068848 | 4/2017 |
| KR | 20120113736 A | 10/2012 |
| KR | 101478016 B1 | 1/2015 |
| KR | 101847847 B1 | 4/2018 |

OTHER PUBLICATIONS

First Office Action dated Feb. 28, 2022 for Korean Patent Application No. 10-2020-7028156.
Sang-Seon Yi, et al., A Study on Cluster Topic Selection in Hierarchical Clustering, Dept. of Computer Engineering, Chonbuk National University, 2004.
Office Action dated Nov. 19, 2021 issued for Japanese Patent Application No. 2021-501074.
Second Office Action dated Jun. 14, 2022 for Japanese Patent Application No. 2021-501074.
Notice of Final Rejection dated Sep. 27, 2022 for Korean Patent Application No. 10-2020-7028156.
The first Office Action dated Nov. 9, 2022 issued for Chinese patent application No. 201811610544.4.

* cited by examiner

METHOD AND DEVICE FOR MATCHING SEMANTIC TEXT DATA WITH A TAG, AND COMPUTER-READABLE STORAGE MEDIUM HAVING STORED INSTRUCTIONS

CROSS REFERENCE TO RELATED APPLICATIONS

This application is a National Stage of International Application No. PCT/CN2019/094646, filed on Jul. 4, 2019, which claims priority from Chinese Patent Application 201811610544.4 entitled "METHOD AND DEVICE FOR MATCHING SEMANTIC TEXT DATA WITH A TAG, AND COMPUTER-READABLE STORAGE MEDIUM HAVING STORED INSTRUCTIONS" filed on Dec. 27, 2018. Both of the applications are incorporated herein by reference in their entireties.

FIELD

The present application relates to a data processing method, and in particular, to a method and device for matching semantic text data with a tag, and a computer-readable storage medium having stored instructions.

BACKGROUND

With the development of mobile Internet, people are increasingly inclined to express opinions or seek relevant consultation on a mobile device, for example, by using an APP's self-service for message consultation, and using social networks such as Weibo to express ideas, and so on. In this context, a large amount of unstructured short text data will be produced, and these data often contain users' core demands or suggestions for optimization of products and services.

For these valuable data, relevant departments often first carry out text classification in their daily analysis work, and a traditional method of the text classification is mainly through manual marking, which is-inefficient. Therefore, improving the analysis and mining ability for such data, especially the level of automatic mining, will significantly reduce daily operating costs. In addition, at present, the text of users' comment data on the mobile network is short, and has serious colloquial language, scattered information value, irregular language styles, and different expression ways for users with different personalities, bringing great challenges to traditional semantic analysis feature extraction.

A traditional method of short text classification is mainly based on a large number of user-labeled sample corpora to train a classification model, mainly characterized by including: analyzing a sample corpus library by a user and manually defining a fixed sample classification tag system. Based on the defined business classification tag system, each sample in the sample corpus library is manually screened one by one, to be labeled with an appropriate tag, thereby constructing a sample data set for training of the classification model. The classification model is trained with respect to the constructed sample data set. Features of short text are extracted based on a vector space model, or a method of "frequent term set extraction" or term frequency-inverse document frequency (TF-IDF), and then based on the extracted text features, a classification algorithm, such as SVM, is used for training to form a final classification model.

SUMMARY

In order to classify semantic text data such as user comments, the present application provides a method and device for matching semantic text data with a tag, and a computer-readable storage medium having stored instructions.

According to one aspect of the present application, there is provided a method for matching semantic text data with a tag, including: pre-processing a plurality of semantic text data to obtain original corpus data comprising a plurality of semantically independent members; determining a degree of association between any two of the plurality of semantically independent members based on a reproduction relationship of the plurality of semantically independent members in a natural text, and determining a theme corresponding to the association based on the degree of association between the any two semantically independent members, and then determining a mapping probability relationship between the plurality of semantic text data and the theme; selecting one of the plurality of semantically independent members corresponding to the association as a tag of the theme, and mapping the plurality of semantic text data to the tag based on the determined mapping probability relationship between the plurality of semantic text data and the theme; and using determined mapping relationship between the plurality of semantic text data and the tag as a supervision material, and matching unmapped semantic text data with the tag based on the supervision material.

Optionally, the pre-processing includes one or more of segmenting the plurality of semantic text data, removing a stop word, removing a non-Chinese character, removing a numeric symbol, and performing word error correction.

Optionally, the pre-processing includes extracting only the plurality of semantic text data containing negative semantics and/or question semantics.

Optionally, the reproduction relationship in the natural text is a degree of association of context reproduction in the original corpus data and/or in the natural text corpus library.

Optionally, the determining the degree of association between any two of the plurality of semantically independent members includes: indexing all semantically independent members in the original corpus data; determining a word vector of the plurality of semantically independent members in the original corpus data, and determining a similarity between any two of the plurality of semantically independent members; and constructing a similarity matrix of a semantically independent member pair based on the indexing and the similarity.

Optionally, the determining the theme corresponding to the association based on the degree of association between the any two semantically independent members includes: performing Gibbs iterative sampling on the similarity matrix to obtain a mapping relationship between the original corpus data and the theme, and a mapping relationship between the theme and the semantically independent member pair, and then determining the mapping probability relationship between the plurality of semantic text data and the theme and a mapping probability relationship between the theme and the plurality of semantically independent members.

Optionally, the selecting one of the plurality of semantically independent members corresponding to the association as a tag of the theme includes: clustering the plurality of semantic text data, and determining the theme of the plurality of semantic text data after clustering based on the mapping relationship between the plurality of semantic text data and the theme; and mapping the theme of the plurality of semantic text data after clustering as a semantically independent member based on the mapping probability relationship between the theme and the plurality of the semantically independent members, to use the semantically independent member as the tag corresponding to the theme after clustering.

Optionally, the determining the theme of the plurality of semantic text data after clustering based on the mapping probability relationship between the plurality of semantic text data and the theme includes: determining a maximum probability theme of each of the plurality of semantic text data; determining a number of the maximum probability themes in each cluster; and using the maximum probability theme with a largest number in the cluster as the theme after clustering.

Optionally, the method further includes: determining a predetermined number of semantically independent members with a highest probability value corresponding to the theme after clustering based on the mapping probability relationship between the theme and the plurality of the semantically independent members, to serve as the tag of the theme after clustering.

Optionally, the method further includes: if the tags of different themes after clustering comprise a same tag, comparing probability values of the same tag in the different themes after clustering, and keeping the tag with a largest probability value as the tag of the theme after clustering to which the tag with a largest probability value belongs; and for themes except for the theme after clustering to which the tag with a largest probability value belongs, using a semantically independent member whose probability value is lower than the probability values of the same tag as the tag of the theme after clustering According to another aspect of the present application, there is provided a device for matching semantic text data with a tag, including: a pre-processing unit configured to pre-process a plurality of semantic text data to obtain original corpus data comprising a plurality of semantically independent members; a theme model unit configured to determine a degree of association between any two of the plurality of semantically independent members based on a reproduction relationship of the plurality of semantically independent members in a natural text, and determine a theme corresponding to the association based on the degree of association between the any two semantically independent members, and then determine a mapping probability relationship between the plurality of semantic text data and the theme; a tag-determining unit configured to select one of the plurality of semantically independent members corresponding to the association as a tag of the theme, and map the plurality of semantic text data to the tag based on the determined mapping probability relationship between the plurality of semantic text data and the theme; and a tag-matching unit configured to use determined mapping relationship between the plurality of semantic text data and the tag as a supervision material, and match unmapped semantic text data with the tag based on the supervision material.

Optionally, the pre-processing includes one or more of segmenting the plurality of semantic text data, removing a stop word, removing a non-Chinese character, removing a numeric symbol, and performing word error correction.

Optionally, the pre-processing includes extracting only the plurality of semantic text data containing negative semantics and/or question semantics.

Optionally, the reproduction relationship in the natural text is a degree of association of context reproduction in the original corpus data and/or in the natural text corpus library.

Optionally, the theme model unit configured to determine the degree of association between any two of the plurality of semantically independent members includes the theme model unit configured to: index all semantically independent members in the original corpus data; determine a word vector of the plurality of semantically independent members in the original corpus data, and determining a similarity between any two of the plurality of semantically independent members; and construct a similarity matrix of a semantically independent member pair based on the indexing and the similarity.

Optionally, the theme model unit configured to determine the theme corresponding to the association based on the degree of association between the any two semantically independent members includes the theme model unit configured to: perform Gibbs iterative sampling on the similarity matrix to obtain a mapping relationship between the original corpus data and the theme, and a mapping relationship between the theme and the semantically independent member pair, and then determine the mapping probability relationship between the plurality of semantic text data and the theme and a mapping probability relationship between the theme and the plurality of semantically independent members.

Optionally, the tag-determining unit configured to select one of the plurality of semantically independent members corresponding to the association as a tag of the theme includes the tag-determining unit configured to: cluster the plurality of semantic text data, and determine the theme of the plurality of semantic text data after clustering based on the mapping relationship between the plurality of semantic text data and the theme; and map the theme of the plurality of semantic text data after clustering as a semantically independent member based on the mapping probability relationship between the theme and the plurality of the semantically independent members, to use the semantically independent member as the tag corresponding to the theme after clustering.

Optionally, the tag-determining unit configured to determine the theme of the plurality of semantic text data after clustering based on the mapping probability relationship between the plurality of semantic text data and the theme includes the tag-determining unit configured to: determine a maximum probability theme of each of the plurality of semantic text data; determine a number of the maximum probability themes in each cluster; and use the maximum probability theme with a largest number in the cluster as the theme after clustering.

Optionally, the tag-determining unit is configured to: determine a predetermined number of semantically independent members with a highest probability value corresponding to the theme after clustering based on the mapping probability relationship between the theme and the plurality of the semantically independent members, to serve as the tag of the theme after clustering.

Optionally, the tag-determining unit is configured to: if the tags of different themes after clustering comprise a same tag, compare probability values of the same tag in the different themes after clustering, and keep the tag with a largest probability value as the tag of the theme after clustering to which the tag with a largest probability value belongs; and for themes except for the theme after clustering to which the tag with a largest probability value belongs, use a semantically independent member whose probability value is lower than the probability values of the same tag as the tag of the theme after clustering.

According to other aspects of the present application, there is provided a computer-readable storage medium having stored instructions, that when executed by a processor, configure the processor to perform the method described herein.

BRIEF DESCRIPTION OF THE DRAWINGS

The above and other objectives and advantages of the present application will be more complete and clear from the following detailed description in conjunction with the accompanying drawings, wherein the same or similar elements are represented by the same reference numerals.

DETAILED DESCRIPTION

For brevity and illustrative purposes, the present application mainly refers to its exemplary embodiments to describe the principles of the present application. However, those skilled in the art will readily recognize that the same principles can be equivalently applied to all types of performance testing systems and/or performance testing methods for visual perception systems, and these same or similar principles can be implemented therein, while any such changes do not deviate from the true spirit and scope of the present patent application.

First Embodiment

Figure 1:
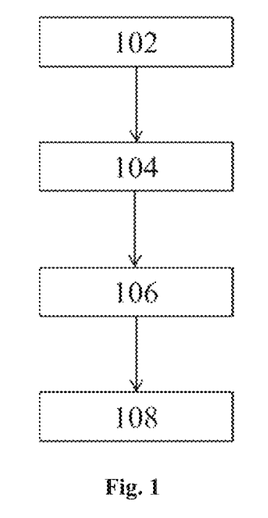
FIG. 1 shows a flowchart of a method for matching semantic text data with a tag according to an embodiment of the present application.

Referring to FIG. 1, which shows a flowchart of a method for matching semantic text data with a tag according to an embodiment of the present application. In step 102, user comment data may be pre-processed. The purpose of pre-processing is to process semantic text data such as user comments to obtain semantically independent members (morphemes such as English words, Chinese words, etc.) and original corpus data. Each semantically independent member is an independent unit for semantic analysis. In particular, a semantically independent member can also be a smallest unit for semantic analysis.

Figure 2:
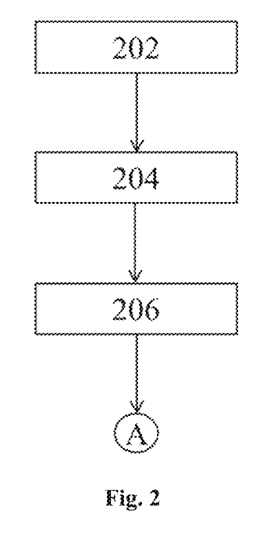
FIG. 2 shows a flowchart of pre-processing according to an embodiment of the present application.

In the embodiment shown in FIG. 2, in order to obtain semantically independent members, word segmentation can be implemented through a Chinese word segmentation toolkit such as jieba (step 202). Then, removing a stop word, removing a non-Chinese character, removing a numeric symbol, and performing word error correction may be carried out on the independent members after word segmentation (step 204). Secondly, as an optional pre-processing, a sentence that contains a user's key intention can also be extracted (not shown in the figure). For example, in user feedback information of a data platform as contents of user comments, only a sentence(s) containing a negative word(s) or a question word(s) can be extracted as a core sentence(s) of original sample, and the semantic independent members and original corpus data can be further obtained, and this step can be directly skipped if it is difficult to extract. Finally, in step 206, multiple semantic independent members may be used to form the original corpus data.

In step 104, a theme model may be determined. A degree of association between any two of the morphemes may be determined based on a reproduction relationship of the morphemes in a natural text, and a theme corresponding to the association may be determined based on the degree of association, and then a mapping probability relationship between the morphemes and the theme may be determined. The reproduction relationship reflects a degree of semantic association between morphemes. For example, in a sentence (or a paragraph of text, etc.), an association between "payment" and context semantics reaches a certain value X, an association between "swiping card" and context semantics reaches a certain value Y, and X≈Y, then it can be considered that there is a strong degree of semantic association between "payment" and "swiping card". The association between "payment" and context semantics can be obtained, for example, by statistics, so the association between "payment" and context semantics may be determined, in statistics, based on its reproduction in the natural text. The natural text can be a target text used for investigation and processing (the original corpus data herein), or it can be any meaningful natural text library, such as Baidu Encyclopedia, Wikipedia, Sogou Internet corpus and other natural text corpus library.

Figure 3:
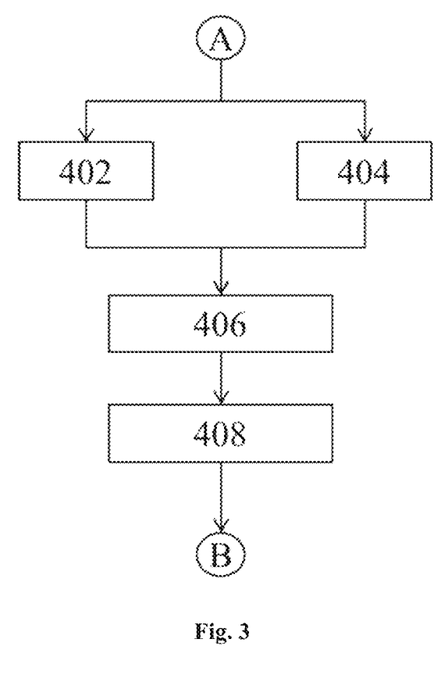
FIG. 3 shows a flowchart of constructing a theme model according to an embodiment of the present application.

Specifically, step 104 may be implemented in the embodiment shown in FIG. 3. In step 402, a word vector may be trained. For the pre-processed corpus, training a word vector may be achieved through a gensim toolkit, for subsequent short text modeling. If less data is collected, an effect of word vector training is common, introducing a large Chinese corpus library such as a Sogou Internet corpus library as a supplement may be considered, or a Chinese vector model that is open source of Google can directly be used. A word vector can make up for a defect that the TF-IDF cannot measure a semantic similarity between words.

In step 404, a word pair similarity matrix may be created. Indexes for different words in the text may be established, wherein an index may exist as a label of a word.

In step 406, a word pair-theme probability distribution matrix may be generated based on a Chinese Restaurant Process (CRP) first. Then a number of word pairs that appear in each document may be counted based on a set of word pairs, and a 1×N-dimensional matrix may be used to store the number of all word pairs that appear in the document. A word pair may be a pairing of any two words as basic morphemes. Finally, a word pair similarity matrix Sim may be created for subsequent processing.

In step 408, the Sim matrix may be used to perform Gibbs iterative sampling, and an overall corpus library-theme matrix and a theme-word pair matrix may be obtained by a Gibbs sampling in a word pair theme model, and a text model may be established. The specific process may be as follows:

First, initialization parameters of the word pair theme model may be set: prior parameters of Dirichlet distribution $\alpha=0.5$, $\beta=0.1$, a maximum number of iterations=100, and a step size for saving intermediate results savestep=10, etc.

Secondly, the set of word pairs of the corpus library may be traversed circularly. In each sampling process, a similarity between word pairs may be considered to assign a theme for a word pair, wherein the word pair similarity may be mainly generated based on the Chinese Restaurant Process:

$$p(D_n = k|D_{-n}) =$$

$$\begin{cases} \dfrac{d_k}{d_0 + n - 1}, & \text{word pair } n \text{ belongs to an existing theme } k \\ \dfrac{d_0}{d_0 + n - 1}, & \text{word pair } n \text{ belongs to a new theme } k + 1 \end{cases}$$

wherein $d_1$ represents a number of existing word pairs for a theme i, n−1 represents a total number of word pairs that have existed before a current word pair, and $d_0$ is an initial parameter. $p(D_n=k|D_{-n})$ represents a probability of assigning a word pair $D_n$ to a theme k.

Thirdly, the corpus library-theme matrix and theme-word pair matrix may be updated based on the assignment of themes for word pairs, and then whether the number of iterations reaches an integer multiple of savestep may be determined, and if not, traversing the set of word pairs of the corpus library may be continued.

Finally, the corpus library-theme matrix and theme-word pair matrix may be saved, and whether the number of iterations reaches the maximum number of iterations (100 times) may be determined, and if not, traversing the set of word pairs of the corpus library may be continued; the final generated corpus library-theme matrix and theme-word pair matrix may be saved.

Figure 4:
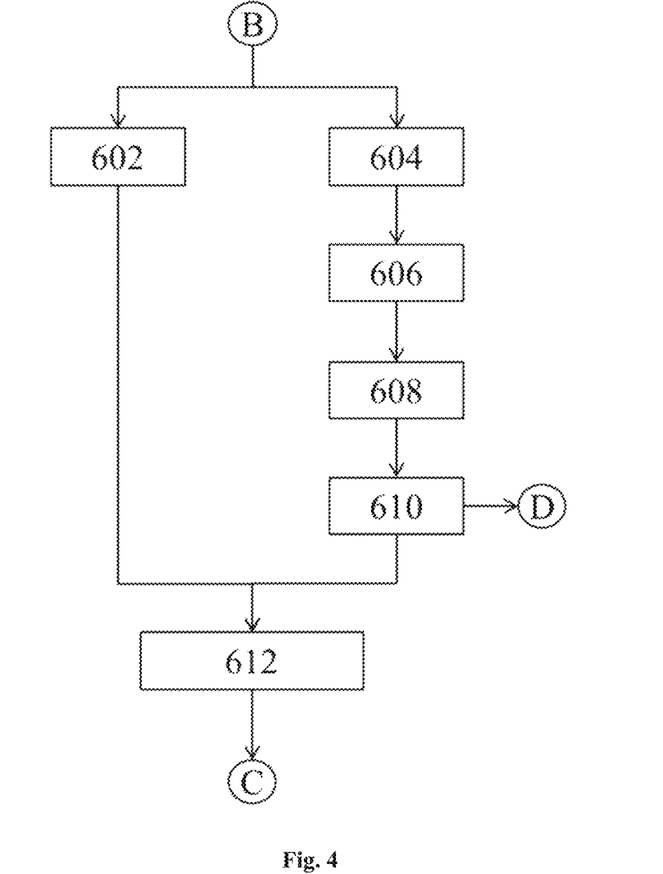
FIG. 4 shows a flowchart of classification tag learning according to an embodiment of the present application.

Returning to FIG. 1, in step 106, learning of a classification tag may be performed. Specifically, as shown in FIG. 4, a user comment-theme probability distribution matrix (step 604) and a theme-word probability distribution matrix (step 602) may be generated by reasoning. A short text theme matrix may be used to represent short text, that is, probability distribution of themes may be used to represent a short text feature:

$$d_i = (p(z_0|d_i), p(z_1|d_i), \ldots, p(z_{k-1}|d_i))$$

wherein $p(z_i|d_i)$ may represent a probability of theme $z_i$ in short text $d_i$, and k may be the number of themes on the entire short text corpus.

In step 606, methods such as K-Means clustering may be used to cluster the entire corpus library, wherein a JS distance may used in the clustering algorithm to measure a similarity of texts:

$$sim(d_i, d_j) = \frac{1}{2}D_{KL}(d_i \| d_j) + \frac{1}{2}D_{KL}(d_j \| d_i)$$

wherein $D_{KL}(p, q) = \Sigma p_i \log \dfrac{p_i}{q_i}$.

In step 608, all user comment corpus in a cluster may be traversed, to find a maximum probability theme of each comment data based on the user comment-theme matrix, to count a number of different maximum probability themes, and to extract a theme with a largest number to cluster themes (step 610). In step 612, from the theme-word probability matrix, top n words with a highest probability value may be selected as tag information of the cluster. Repetition of tag keywords of each cluster may be checked, and if a keyword is repeated in different clusters, a keyword under themes corresponding to respective clusters may be re-selected by checking probability values of the same keyword under respective themes, and replacing a keyword with a small value by a word or phrase with a next probability value.

Figure 5:
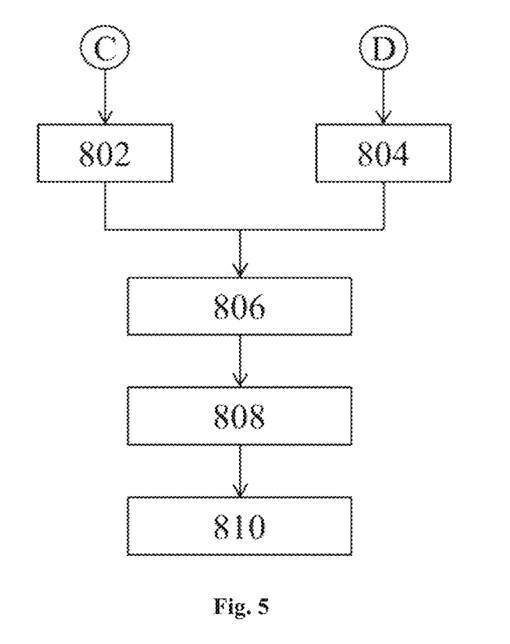
FIG. 5 shows a flowchart of classification model training according to an embodiment of the present application.

Returning to FIG. 1, in step 108, a classification model may be trained, specifically, as shown in the embodiment in FIG. 5. In step 802, based on classification category information learned in step 106, user comment corpus may be automatically tagged with a classification tag, so as to obtain a mapping relationship between user comments and tags. In step 804, user comment corpus may be obtained based on user comments after clustering themes. In step 806, a TF-IDF and a word vector may be extracted for each user comment corpus as a text feature. Then, two classification algorithms of SVM and two-way LSTM may be used to train the classification model (step 808), and then a voting classifier may be used for voting aggregation, to construct the classification model of user comments (step 810).

Second Embodiment

This embodiment mainly analyzes user feedback messages of a data platform, first, semantic feature information of user feedback messages of the data platform may be extracted based on a short text feature extraction method proposed by the present invention, and then a classification model may be constructed to achieve automatic classification of user feedback messages. The data source is data of APP user feedback messages of the data platform in a certain month. Original data may be mainly saved in the form of text. Specific examples may be seen in Table 1:

TABLE 1

| 1 | When binding an account, it always appears: The number of users associated with the ID number exceeds the limit . . . ? |
|---|---|
| 2 | Real-name authentication cannot be changed. Sometimes a child's account is authenticated by the parents, but the child wants to change to her/his own as the child grows up |
| 3 | Hello, dear platform user, how to cancel the real-name authentication |
| 4 | How to change the real-name authentication, I used someone else's before, but now I want to change it |
| 5 | My mobile number is about to be cancelled, but how can I cancel the real-name authentication on a platform where this number is registered? |
| 6 | The real-name authentication using a credit card can never be passed, and it prompts that the name and registration do not match, but the credit card information is updated in real time, therefore they must match. |
| 7 | The refueling discount shows a remaining of 97%, but why is there no discount when I refuel an amount of 200?!! |

The automatic classification of user feedback messages of the data platform may be performed, for example, based on the following example.

Step 1. Pre-Processing of Feedback Message Data

Through analysis of a large amount of data, in most cases, a user will ask a question by means of a negative word(s) or a question word(s). Therefore, in order to further refine key information, we may extract a negative window of user feedback messages by adopting the following methods:

1.1 Using a common Chinese or English symbol(s) (such as a full or half-width comma, full stop, etc.) to divide a sentence into several short sentences;

1.2 Finding a short sentence where the first negative word or question word is located as a window;

1.3 Setting a specified window size (a step length set herein is 1), and extracting the negative window.

Step 2. Feature Representation of User Feedback Short Text of the Data Platform 2.1 For pre-processed corpus in step 1, a Skip-gram model in a Word2Vec method proposed by Google may be used, and a word2vec function in a gensim library may be used for training, wherein a word vector dimension may be set to 200, and a window size of the Skip-gram model may be 5. Table 2 shows exemplary results.

TABLE 2

| 12338 200 | |
|---|---|
| Payment | 0.96190494 −0.55271983 −1.1351707 2.9649851 0.55138743 −1.4062612 |
| Unionpay | −0.1588244 0.31029588 −1.1813537 −0.41154397 −0.59113073 −1.520227 |
| Transaction | 0.95009565 −1.318141 0.52134734 −1.0983187 −1.7604179 1.0493838 −1 |
| Query | 0.59988099 −2.2386034 −0.81286919 −0.58098698 −1.098406 1.2111719 |
| Activity | 0.16843978 −0.81795216 0.72090399 0.54677039 2.0543208 0.47006935 |
| Customer service | 0.56449211 −1.4457349 0.28419182 −0.88754481 −1.364911 1.7530851 − |
| Information | 0.8498913 −1.703282 −0.014489307 −1.7420455 −0.30530801 0.3661728 |
| Bank | −0.90459341 −0.052472115 −0.51684093 1.1594703 −2.1315813 −0.28694 |
| Card | 0.10345861 0.10014063 1.4365104 −0.60930985 −0.15822358 −2.4952877 − |
| Provide | 0.33992413 −1.1052862 −0.44844544 −2.3649466 −1.3367232 −0.2897117 |
| Bank card | −0.54364794 1.803349 −0.5171805 1.6957979 −1.15844265 −0.252941 |
| Usage | −0.45044637 −0.24351105 −0.042879369 −0.013118549 −0.13967912 −0.7 |
| China unionpay | −0.41684532 −0.72683388 0.31724322 −0.23833741 −0.32528564 0.1 |
| Quick pay | −0.7814253 −1.0859822 0.84116238 0.9195742 1.0880324 0.000879181 |
| Inconvenience | 1.3906984 −0.23371695 0.4681406 −2.9523919 −4.0855327 1.0970926 −1 |
| Unionpay wallet | −2.7984693 0.17580885 −0.073800042 1.1041703 −0.28069007 −0.40 |
| Open | −0.50489795 0.23756146 −1.1975474 0.620086296 −0.344927 −1.6934112 |
| Merchant | 0.70111215 −0.2033094 0.65828037 0.6257388 −0.14964104 1.6606965 − |
| Mobile phone | −1.1366373 −2.5958667 −0.7614854 1.1263371 −0.18351506 −0.76885307 |
| Discount | −1.674103 −1.391085 0.92404991 −1.7375698 1.7659662 0.67350048 −0. |
| Suggest you | −0.42206705 −0.64283347 −0.50005472 −0.47150567 −1.3520527 0.798 |

2.2 Word vectors may be compared by comparing word vectors of Baidu Encyclopedia and that of a special-purpose domain:

TABLE 3

| Word vectors of Baidu Encyclopedia | Word vectors of a special-purpose domain |
|---|---|
| ('Quick pay', 0.8876532316207886) | ('Cloud payment', 0.7113977074623108) |
| ('Esurfing phone', 0.8041104674339294) | ('Unionpay wallet', 0.6253437995910645) |
| ('Dual-network and dual-standby', 0.7926369905471802) | ('Cloud quick', 0.5981202125549316) |
| ('Dual-standby', 0.7770497798919678) | ('Quick pay', 0.5895633101463318) |
| ('Mobile payment', 0.7767471075057983) | ('QR code', 0.5603029727935791) |
| ('Swipe card reader', 0.7745838761329651) | ('Mobile phone', 0.50169668250274658) |
| ('PayByFinger', 0.7724637985229492) | ('app', 0.49683672189712525) |
| ('Wechat end', 0.7695549130439758) | ('Alone', 0.4926530122756958) |
| ('Dual-mode and dual-standby', 0.7687188386917114) | ('Quick', 0.490323543548584) |
| ('Smart phone', 0.7658545970916748) | ('Scan code', 0.4879230260848999) |

Word vectors can more accurately express the knowledge of the payment domain, which provides more accurate semantic information for subsequent classification.

Gibbs sampling may be used to obtain the overall user comment corpus library-theme matrix and theme-word pair matrix: wherein prior parameters of Dirichlet distribution $\alpha=0.5$, $\beta=0.1$, the maximum number of iterations=500, and the step size for saving intermediate results is 10.

Figure 6:
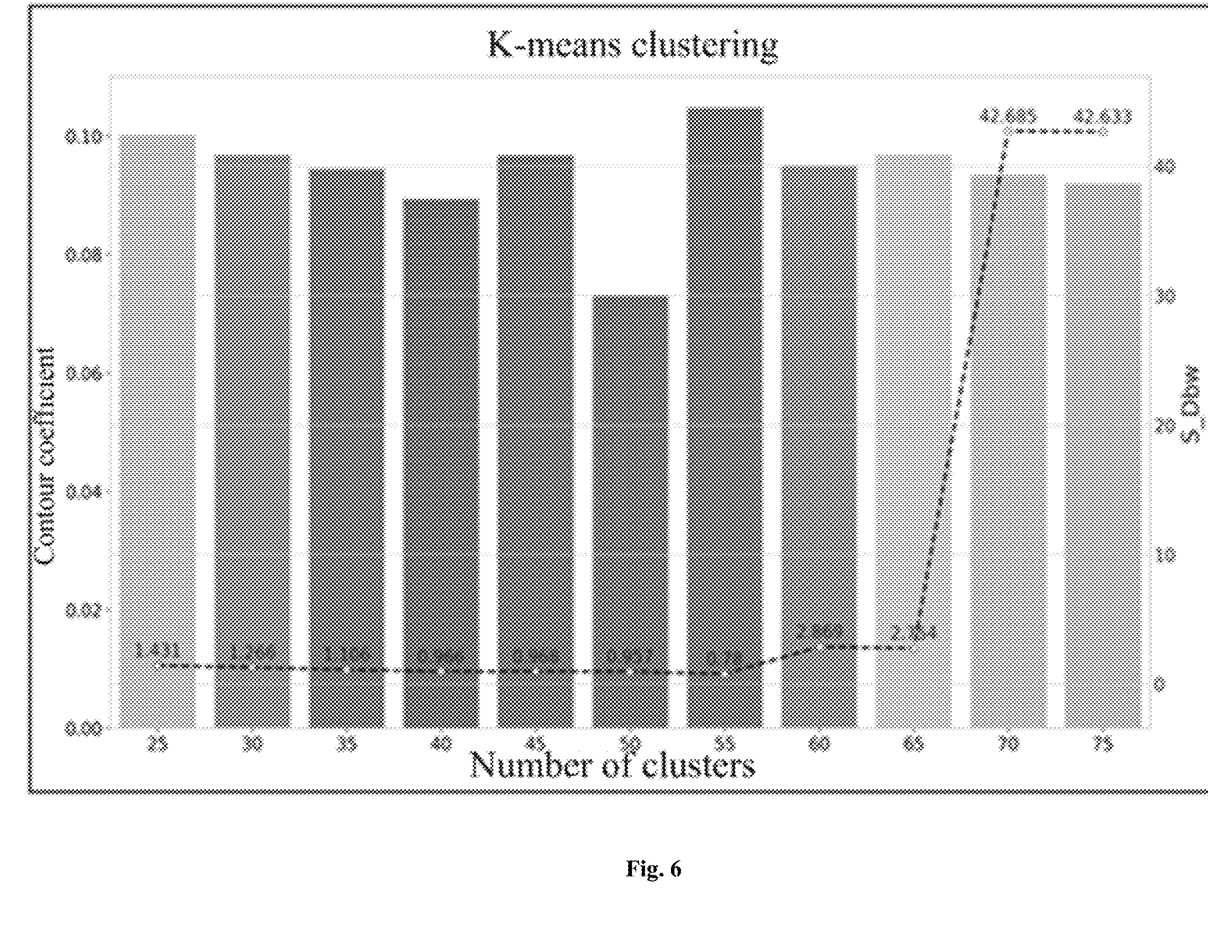
FIG. 6 shows a schematic diagram of K-means clustering according to an embodiment of the present application.

Step 3. Extraction of Classification Tags for User Feedback Messages of the Data Platform 3.1 Obtained feature matrixes described above may be taken as inputs and a scikit-learn machine learning toolkit may be used to perform K-means clustering (FIG. 6). It should be noted that, in order to cooperate with a subsequent cluster merging method, in this scenario, we may set an initial number of clusters to 60, and the final number of clusters may be jointly determined based on a contour coefficient and S_Dbw.

3.2 Text in a cluster may be traversed, and a theme with a largest theme probability value under the text may be found based on the text-theme probability distribution matrix; a proportion of each theme under the cluster may be counted, to find a theme with a largest number of occurrences; in the theme-word matrix, the theme with the largest number of occurrences counted in the previous step may be found, and then words or phrases with top ten probability values under the theme may be found as cluster description (as shown in Table 4 and Table 5).

TABLE 4

| Questions of transaction query | | | | | | |
|---|---|---|---|---|---|---|
| Category | | | | Hit Keywords | | |
| Query class | Red envelope | New people | | New user | Registration | Recommendation |
| | | Sign in | | | | |
| | | Transfer | | | | |
| | | Consumption | | | | |
| | | Metropolis | | Subway | | |

TABLE 4-continued

Questions of transaction query

| Category | Hit Keywords | | | |
|---|---|---|---|---|
| Incentive pay | Reception | Failure | | |
| Telephone bill | Recharge | None | Not into the account | Unsuccessful |
| Order | Transaction | Close | Failure | Red envelope not returned |
| Discount | Failing to enjoy Discount coupon | Download | | |
| Public pay | Function Unsuccessful | Not open | | |
| Shopping mall | Logistic Refund Payment failure | | | |
| Transfer | Transaction Payment Over-limit | Display Prompt Quota | Failure Unsuccessful | |

TABLE 5

Questions of function consultation

| | Category | Hit keywords | | | | |
|---|---|---|---|---|---|---|
| Consultation class | Mobile phone number | Modification Reservation | Change Bind a card | Alteration Inconsistence | | |
| | OR code | Payment | Pay | Scan a card | | |
| | Passcode | Fingerprint Modification | Gesture Change | Log in | Open | Verification |
| | | Forget | Get back | Payment | Log in | |
| | ID card | Modification Format error Unbind Name | Change Real name Log out Inconsistency | Authentication | | |
| | Detail | Transaction | Record | | | |
| | Bank card | Bind a card Unbind | Number | | | |
| | | Order | Card | Payment | Deduct Money | Setting |
| | Quick pay | Open No card | Usage Payment | | | |
| | Balance | Query | Bill | | | |
| | Log out | Account ID card | | | | |
| | Verification code Money receiving code | Reception Application | Fail to receive | | | |

Step 4. Automatic Classification of User Messages of the Data Platform 4.1 A sklearn package may be used to carry out classification experiments of a machine learning algorithm, mainly by using a SVM algorithm to ensure accuracy of a classification index and using 5-fold cross-validation to ensure stability of the result.

Figure 7:
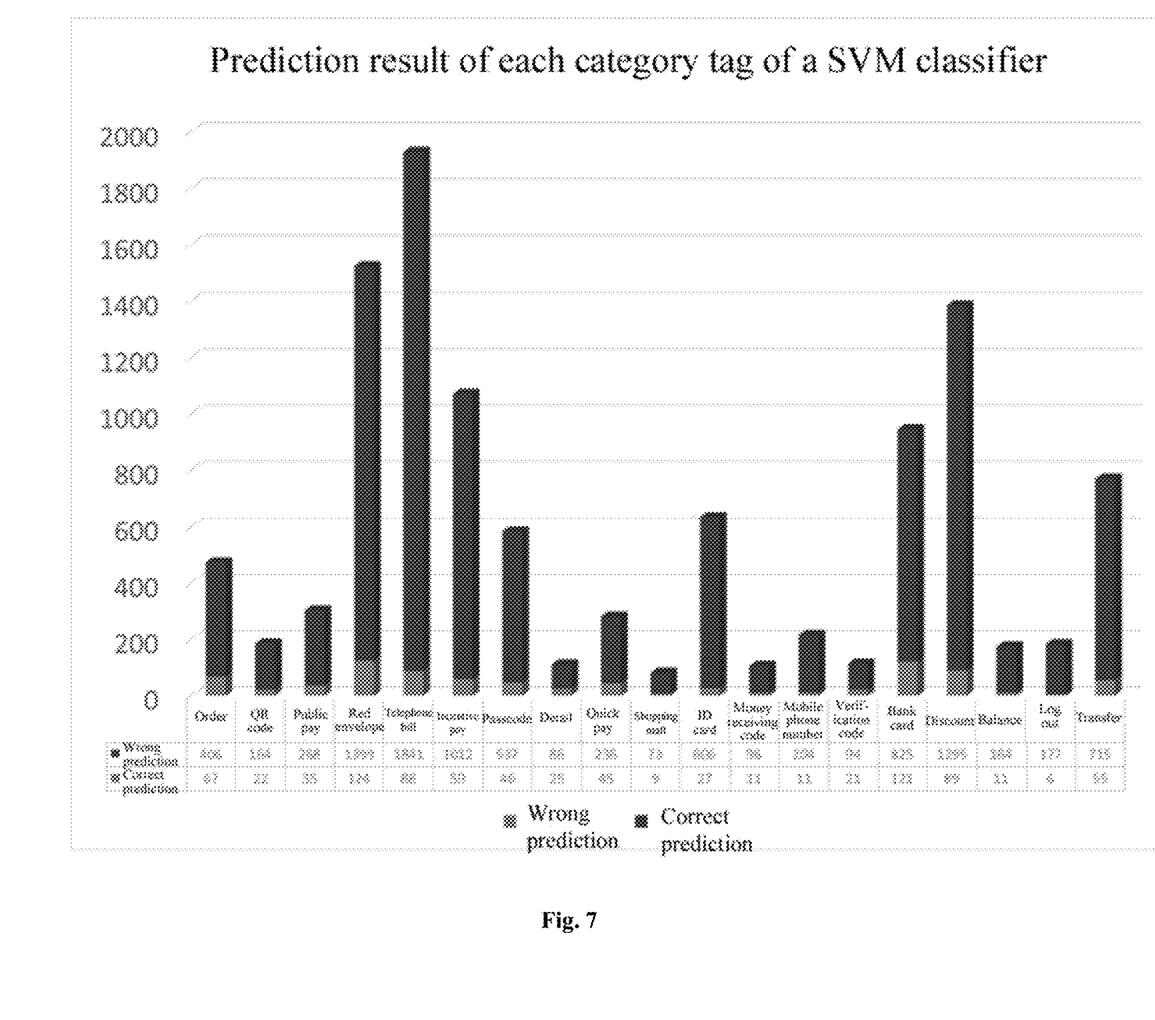
FIG. 7 shows a prediction result of each category tag of a SVM classifier according to an embodiment of the present application.

The construction process of the classification model may use GridSearch to obtain optimal SVM parameters, that is, the parameters may be set as follows: C=3.276, kernel='rbf', and gamma=0.01. FIG. 7 shows an example of tag prediction results according to this configuration.

4.2 In an actual application scenario, such as a data platform scenario, in order to improve usability of the model, a probability threshold of classification prediction may be set. For category data with low prediction probability, they may be manually processed. Considering the model accuracy rate and recall rate comprehensively, the threshold may be set to 0.6.

Using the method of automatic reply for APP user comments proposed herein, on the one hand, hot topic categories in short text data such as user comments can effectively be mined, and main consultation hotspots of users in the process of using a product may be grasped. On the other hand, automatic classification of user comments can be achieved. Therefore operational service efficiency of APP can be greatly improved.

The classification tag system mentioned in the present invention is based on a self-learning method, and does not require business personnel to manually analyze all text information in short text corpus, and subsequent update and maintenance of the tag system are also automatically completed, which can greatly reduce workload of manual participation, and is easier to apply in actual scenarios. The classification training corpus of the present invention is also generated during the classification tag process, and thus there is no need to manually label the corpus library. In the process of classification tag extraction, the present invention may combine the entire short text corpus for topic modeling, effectively alleviating the problem of sparse text semantics. In the process of theme-word pair sampling, the similarity of word pairs may be integrated, and thus considering contextual association relationship of different word pairs in the text, wider semantic features in the text can be extracted, and semantic expression ability can be stronger. In the process of text classification, features of each short text include features calculated by TF-IDF as well as features extracted by the theme model, which not only considers from a statistical perspective, but also integrates features of contextual information.

The above examples mainly illustrate a method for matching semantic text data with a tag, a device for matching semantic text data with a tag, and a computer-readable storage medium having stored instructions. Although only some of the embodiments of the present invention have been described, those of ordinary skill in the art should understand that the present invention can be implemented in many other forms without departing from its gist and scope. Therefore, the examples and implementations shown are regarded as illustrative rather than restrictive, and the present invention may cover various modifications and replacement without departing from the spirit and scope of the present invention as defined by the appended claims.

What is claimed is:

1. A method for matching semantic text data with a tag, comprising:
   pre-processing a plurality of semantic text data to obtain original corpus data comprising a plurality of semantically independent members;
   determining a degree of association between any two of the plurality of semantically independent members based on a reproduction relationship of the plurality of semantically independent members in a natural text, and determining a theme corresponding to the association based on the degree of association between the any two semantically independent members, and then determining a mapping probability relationship between the plurality of semantic text data and the theme, wherein the reproduction relationship in the natural text is a degree of association of context reproduction in the original corpus data and/or in a natural text corpus library;
   selecting one of the plurality of semantically independent members corresponding to the association as a tag of the theme, and mapping the plurality of semantic text data to the tag based on the determined mapping probability relationship between the plurality of semantic text data and the theme to produce a determined mapping relationship between the plurality of semantic text data and the tag; and
   matching unmapped semantic text data with the tag based on the determined mapping relationship between the plurality of semantic text data and the tag.

2. The method of claim 1, wherein:
   the pre-processing comprises one or more of segmenting the plurality of semantic text data, removing a stop word, removing a non-Chinese character, removing a numeric symbol, and performing word error correction.

3. The method of claim 1, wherein:
   the pre-processing comprises extracting only the plurality of semantic text data containing negative semantics and/or question semantics.

4. The method of claim 1, wherein the determining the degree of association between any two of the plurality of semantically independent members comprises:
   indexing all semantically independent members in the original corpus data;
   determining a word vector of the plurality of semantically independent members in the original corpus data, and determining a similarity between any two of the plurality of semantically independent members; and
   constructing a similarity matrix of a semantically independent member pair based on the indexing and the similarity.

5. The method of claim 4, wherein the determining the theme corresponding to the association based on the degree of association between the any two semantically independent members comprises:
   performing Gibbs iterative sampling on the similarity matrix to obtain a mapping relationship between the original corpus data and the theme, and a mapping relationship between the theme and the semantically independent member pair, and then determining the mapping probability relationship between the plurality of semantic text data and the theme and a mapping probability relationship between the theme and the plurality of semantically independent members.

6. The method of claim 5, wherein the selecting one of the plurality of semantically independent members corresponding to the association as a tag of the theme comprises:
   clustering the plurality of semantic text data, and determining the theme of the plurality of semantic text data after clustering based on the mapping relationship between the plurality of semantic text data and the theme; and
   mapping the theme of the plurality of semantic text data after clustering as a semantically independent member based on the mapping probability relationship between the theme and the plurality of the semantically independent members, to use the semantically independent member as the tag corresponding to the theme after clustering.

7. The method of claim 6, wherein the determining the theme of the plurality of semantic text data after clustering based on the mapping probability relationship between the plurality of semantic text data and the theme comprises:
   determining a maximum probability theme of each of the plurality of semantic text data;
   determining a number of the maximum probability themes in each cluster; and
   using the maximum probability theme with a largest number in the cluster as the theme after clustering.

8. The method of claim 7, further comprising:
   determining a predetermined number of semantically independent members with a highest probability value corresponding to the theme after clustering based on the mapping probability relationship between the theme and the plurality of the semantically independent members, to serve as the tag of the theme after clustering.

9. The method of claim 8, further comprising:
   if the tags of different themes after clustering comprise a same tag, comparing probability values of the same tag in the different themes after clustering, and keeping the tag with a largest probability value as the tag of the theme after clustering to which the tag with a largest probability value belongs; and
   for themes except for the theme after clustering to which the tag with a largest probability value belongs, using a semantically independent member whose probability value is lower than the probability values of the same tag as the tag of the theme after clustering.

10. A computer-readable storage medium having stored instructions, that when executed by a processor, configure the processor to perform the method of claim 1.

11. A device for matching semantic text data with a tag, comprising:

a processor; and a memory for storing instructions executable by the processor;

wherein the processor is configured to:

pre-process a plurality of semantic text data to obtain original corpus data comprising a plurality of semantically independent members;

determine a degree of association between any two of the plurality of semantically independent members based on a reproduction relationship of the plurality of semantically independent members in a natural text, and determine a theme corresponding to the association based on the degree of association between the any two semantically independent members, and then determine a mapping probability relationship between the plurality of semantic text data and the theme, wherein the reproduction relationship in the natural text is a degree of association of context reproduction in the original corpus data and/or in a natural text corpus library;

select one of the plurality of semantically independent members corresponding to the association as a tag of the theme, and map the plurality of semantic text data to the tag based on the determined mapping probability relationship between the plurality of semantic text data and the theme to produce a determined mapping relationship between the plurality of semantic text data and the tag; and match unmapped semantic text data with the tag based on the determined mapping relationship between the plurality of semantic text data and the tag.

12. The device of claim 11, wherein:

the pre-processing comprises one or more of segmenting the plurality of semantic text data, removing a stop word, removing a non-Chinese character, removing a numeric symbol, performing word error correction, and extracting only the plurality of semantic text data containing negative semantics and/or question semantics.

13. The device of claim 11, wherein the processor configured to determine the degree of association between any two of the plurality of semantically independent members comprises the processor configured to:

index all semantically independent members in the original corpus data;

determine a word vector of the plurality of semantically independent members in the original corpus data, and determining a similarity between any two of the plurality of semantically independent members; and construct a similarity matrix of a semantically independent member pair based on the indexing and the similarity.

14. The device of claim 13, wherein the processor configured to determine the theme corresponding to the association based on the degree of association between the any two semantically independent members comprises the processor configured to:

perform Gibbs iterative sampling on the similarity matrix to obtain a mapping relationship between the original corpus data and the theme, and a mapping relationship between the theme and the semantically independent member pair, and then determine the mapping probability relationship between the plurality of semantic text data and the theme and a mapping probability relationship between the theme and the plurality of semantically independent members.

15. The device of claim 14, wherein the processor configured to select one of the plurality of semantically independent members corresponding to the association as a tag of the theme comprises the processor configured to:

cluster the plurality of semantic text data, and determine the theme of the plurality of semantic text data after clustering based on the mapping relationship between the plurality of semantic text data and the theme; and map the theme of the plurality of semantic text data after clustering as a semantically independent member based on the mapping probability relationship between the theme and the plurality of the semantically independent members, to use the semantically independent member as the tag corresponding to the theme after clustering.

16. The device of claim 15, wherein the processor configured to determine the theme of the plurality of semantic text data after clustering based on the mapping probability relationship between the plurality of semantic text data and the theme comprises the processor configured to:

determine a maximum probability theme of each of the plurality of semantic text data;

determine a number of the maximum probability themes in each cluster; and use the maximum probability theme with a largest number in the cluster as the theme after clustering.

17. The device of claim 16, wherein the processor is configured to:

determine a predetermined number of semantically independent members with a highest probability value corresponding to the theme after clustering based on the mapping probability relationship between the theme and the plurality of the semantically independent members, to serve as the tag of the theme after clustering.

18. The device of claim 17, wherein the processor is configured to:

if the tags of different themes after clustering comprise a same tag, compare probability values of the same tag in the different themes after clustering, and keep the tag with a largest probability value as the tag of the theme after clustering to which the tag with a largest probability value belongs; and for themes except for the theme after clustering to which the tag with a largest probability value belongs, use a semantically independent member whose probability value is lower than the probability values of the same tag as the tag of the theme after clustering.

\* \* \* \* \*